United States Patent Office 3,172,864
Patented Mar. 9, 1965

3,172,864
ACTIVATION OF DEACTIVATED HYDRO-
DENITRIFICATION CATALYSTS
Jack W. Unverferth, Walnut Creek, Calif., assignor to
California Research Corporation, San Francisco, Calif.,
a corporation of Delaware
No Drawing. Filed Sept. 21, 1961, Ser. No. 139,612
10 Claims. (Cl. 252—419)

This invention relates to processes for hydrogen treating hydrocarbon oils and for activating catalysts used therein. In particular, the invention relates to the activation, reactivation, or regeneration of certain high metal content, sulfided, nickel-molybdenum-alumina catalysts in connection with their use for the hydrogenative removal of nitrogen contaminants from hydrocarbon oils.

In accordance with the invention a high metal content, sulfided, nickel-molybdenum-alumina catalyst containing at least 10 weight percent sulfur combined with the nickel and molybdenum is used for hydrogen treating hydrocarbon oils at elevated temperature and pressure until the catalyst has been deactivated by the deposition thereon of combustible carbonaceous material (commonly referred to as "coke"). A major portion of the carbonaceous material on the catalyst is burned off and a major portion of the nickel and molybdenum sulfides are oxidized to nickel and molybdenum oxides at a catalyst temperature controlled below 750° F., at least during an initial burn, by treating the catalyst with a dry combustion-supporting gas free of sulfur oxides until combustion substantially ceases. The catalyst is subsequently resulfided and then again used for hydrogen treating hydrocarbon oils at elevated temperature and pressure. It is found that, after combustion of the carbonaceous material in the above manner and resulfiding, the catalyst is surprisingly more active than the freshly prepared sulfided catalyst.

The high metal content, sulfided, nickel-molybdenum-alumina catalysts to which the invention applies are unusually active for the hydrogenative conversion to ammonia of nitrogen compounds contained in hydrocarbon oils (hydrodenitrification). This invention provides an improved hydrodenitrification process capable of operation at lower temperatures for longer sustained times by increasing the catalyst activity. By making possible regeneration of the catalysts, the invention extends the useful life of a catalyst charge.

In general, the catalysts contain 3–10 weight percent nickel and 12–30 weight percent molybdenum, with the more active catalysts containing 4–10 percent nickel and 15.5–30 percent molybdenum. A typical preferred catalyst, containing about 7% nickel and about 21% molybdenum, will contain about 15% by weight sulfur when fully sulfided. The sulfur is present principally as $Ni_3S_2$ and $MoS_2$. Any regeneration procedure applied to the high metal content nickel sulfide-molybdenum sulfide-alumina catalysts will necessarily take a long time, in the order of 2–6 days, because there is such a large amount of sulfur to be removed from the catalyst. Hence, it is especially desired to regenerate infrequently and to cut down the time required for regeneration. The present invention provides a rapid and effective regeneration method which thereby greatly improves the process operating factor.

The hydrodenitrification process comprises contacting a hydrocarbon oil of undesired high nitrogen content with excess hydrogen and a catalyst of the above-described type at a relatively fixed space velocity of 0.2–10 LHSV and fixed elevated pressure of 500–5000 p.s.i.g. and at the minimum temperature required to reduce the nitrogen content of the oil to or below a specified value; for example, to below 100 p.p.m., 10 p.p.m., 1 p.p.m., or even below 0.2 p.p.m. The minimum temperature required to accomplish this purification increases over a period of time, due to coke formation on the catalyst, from an initial low temperature, $T_1$, up to a higher maximum operating temperature. The maximum operating temperature may be fixed by the capacity of the furnaces and other heat transfer equipment to preheat the feed to the process. Generally, the maximum operating temperature may be defined as that temperature above which further temperature increases do not materially extend the run length. When the maximum operating temperature is reached, the process is no longer capable of reducing the nitrogen content of the hydrocarbon oil to the specified value at the fixed pressure and space velocity. The process must then be shut down. If a shutdown cannot be conveniently arranged immediately, the run length may be artificially extended by lowering the space velocity, as by cutting the hydrocarbon feed rate to a rate at which the specified product nitrogen content can be achieved. In that case, the process in effect is permitted to shut itself down, as an inoperatively low space velocity will soon be required. In any case, the process must eventually be shut down, and a more active catalyst must be provided before it is possible to resume treating additional quantities of the hydrocarbon oil.

By analogy to other catalytic hydrocarbon conversion processes, it might be thought that the activity of the catalyst could be restored to its initial level simply by burning off the coke responsible for the deactivation in any suitable manner. The futility of attempting to draw such analogies becomes readily apparent when one considers the widely different chemical make-up of the various catalysts and the great variety of regeneration procedures which have been proposed for each catalyst type. Thus, for example, silica-alumina cracking catalysts are commonly regenerated by burning coke deposits with a flue gas-air mixture at atmospheric pressure and temperatures of about 1050° F.; cobalt-molybdate hydrodesulfurization catalysts are commonly regenerated by combustion of coke at temperatures of 850–1050° F. using a stream-air mixture at atmospheric pressure; platinum-alumina reforming catalysts may be regenerated by contacting with flue gas-air at 800–1100° F. and pressures up to 200 p.s.i.g.; chromia-alumina dehydrogenation catalysts may be regenerated 5,000–15,000 times at temperatures as high as 1200° F. when used in a cyclic process such as butane dehydrogenation. None of these methods is satisfactory for regeneration of a deactivated high metal content sulfided nickel-molybdenum-alumina catalyst in that, even though all coke deposits may be removed, the catalyst is not restored to its initial activity. The high metal sulfide content of the catalyst appears to accelerate catalyst sintering and other deactivating effects when exposed to conventional regeneration conditions. Also, a portion of the deactivation is apparently due to changes in the catalyst itself, as compared to mere fouling by coke.

It has now been found that a high metal content, sulfided, nickel-molybdenum-alumina catalyst containing at least 10 weight percent sulfur combined with nickel and molybdenum, which catalyst has been deactivated by the deposition thereon of combustible carbonaceous material during use for hydrogen treating hydrocarbon oils at elevated temperature and pressure, cannot only be regenerated but can actually be activated to greater than the activity of the freshly prepared catalyst by combustion of coke and oxidation of the metal sulfides at low temperatures using a dry combustion supporting gas, such as a nitrogen-air mixture, free of sulfur oxides. In accordance with the invention, the deactivated catalyst is activated by burning a major portion of the carbonaceous material from the catalyst and oxidizing a major portion of the nickel and molybdenum sulfides to nickel and molybdenum oxides at a catalyst temperature controlled below 750° F., at least during an initial burn, by treating the catalyst with a dry combustion-supporting gas free of sulfur oxides until burning substantially ceases, and subsequently resulfiding the catalyst. When the catalyst is employed in a reactor as one or more fixed beds, the catalyst is contacted with the dry combustion supporting gas at below 750° F. until an initial burning wave has passed through the catalyst beds. Some carbonaceous material still remains on the catalyst, and some nickel and molybdenum are still present as the sulfides. The catalyst is then contacted with the dry combustion supporting gas free of sulfur oxides at a maximum catalyst temperature of at least 50° F. higher but controlled below 850° F. while a second burning wave passes through the catalyst beds. The carbonaceous deposits are thereby substantially completely removed and the nickel and molybdenum sulfides are substantially converted to nickel and molybdneum oxides. To assure complete oxidation, it is preferred to increase the oxygen concentration and temperature of the dry combustion supporting gas and to further contact the catalyst therewith at a maximum temperature at least 50° F . higher but controlled below 950° F. until no further burning is observed. In the preferred method the temperature is raised in increments of about 100° F., using a temperature of 500–700° F. during a first burn, especially 500–650° F.; a temperature of 650–850° F. during a second burn, especially 700–800° F.; and a temperature of 800–900° F. during final contacting. The catalyst is then resulfided to convert the nickel and molybdenum oxides back to nickel and molybdenum sulfides, whereupon the catalyst is again ready for use for hydrogen treating hydrocarbon oils. Elevated pressure, above 500 p.s.i.g., is preferably maintained throughout the procedure, for reasons which will be apparent from the discussion hereinafter.

It is found that by proceeding in the above manner the catalyst is made significantly more active than it was when initially used for hydrogen treating hydrocarbon oils. As a result, at a fixed pressure and space velocity, the minimum temperature, $T_2$, initially required to reduce the nitrogen content of a given hydrocarbon oil to a specified value is lower than the temperature, $T_1$, initially required to accomplish this same purification with the freshly prepared catalyst. Consequently, the operating time before the maximum operating temperature is again reached is greatly extended. The method may then be used again to regenerate the catalyst. Further activation is rarely observed, but restoration of the catalyst to its previously activated state (greater than fresh activity) is usually accomplished.

The dry combustion supporting gas may be any suitable mixture of oxygen with an inert carrier gas. Examples are nitrogen-air and flue gas-air mixtures. The gas should be free of sulfur oxides, as such compounds as $SO_2$ are harmful to the catalyst. In a preferred embodiment the catalyst is contacted at elevated pressure with circulating nitrogen to which air is added. Oxidation of the nickel and molybdenum sulfides to metal oxides yields $SO_2$ as a by-product, while combustion of coke yields $CO_2$ and $H_2O$. At least the $SO_2$ must be removed before the nitrogen, with added air, is recycled to contact the catalyst again. The net water production must also be removed to prevent build up in the circulating gas. Both objectives may be achieved, and $CO_2$ also be removed, if desired, simply by scrubbing with a caustic solution at temperatures below about 200° F. Other means for removing $SO_2$ and $H_2O$ may be used instead of or in addition to caustic scrubbing, for example, catalytic or adsorptive contacting.

It is important that the combustion-supporting gas employed be dry. Thus, the use of a steam-air mixture to burn the carbonaceous material from the catalyst is entirely unsatisfactory. Complete exclusion of water vapor is, however, impractical because water is formed as a by-product of the combustion of the carbonaceous material. By "dry" is meant that the molar concentration of water vapor in the combustion supporting gas must be relatively low; at least below about 6 mol percent, and preferably below 1 mol percent. The degree of dryness required cannot readily be expressed in terms of a maximum water vapor partial pressure, because elevated pressures are preferred during the combustion steps. Although the combustion supporting gas contains only a small percentage of water vapor, at a sufficiently high total pressure, the water vapor partial pressure could be in excess of 15 p.s.i.a. Thus, the water vapor partial pressure could in some cases be greater than would be the case if a steam-air mixture were employed at atmospheric pressure. Elevated pressure is advantageous in helping to maintain the required low water vapor concentration. Thus, when burning coke from the catalyst with circulating nitrogen-air at 1000 p.s.i.g., mere cooling of the gas (after contacting the catalyst) to about 150° F. is adequate to condense out any moisture in excess of about 0.4 mol percent. The condensed water may be collected in the caustic solution used to remove the $SO_2$, whereupon the dried gas may be recycled for further contacting of the catalyst (make-up oxygen first being added). The oxygen concentration is controlled below about 6 mol percent, preferably 0.1–2 mol percent, as required to maintain the maximum catalyst temperature within the aforementioned limits during combustion.

The following examples illustrate the effect of conditions during combustion of coke deposits on a high metal content, sulfided, nickel-molybdenum-alumina catalyst and the advantages gained by operation in accordance with the invention. The first example illustrates the preparation and use of a catalyst of the type to which the invention applies.

*Example I*

A catalyst was prepared by impregnating preformed ⅛ inch alumina extrudate with nickel nitrate, calcining, then impregnating with ammonium molybdate, calcining, again impregnating with ammonium molybdate, and calcining. This produced an oxide catalyst which contained 20.5% molybdenum (expressed as metal) and 6.4% nickel (expressed as metal) on a support consisting essentially of alumina. The catalyst was placed in a reactor as three fixed beds of catalyst, with liquid distributing trays between the beds. The catalyst was then sulfided by circulating hydrogen containing 1% dimethyldisulfide through the reactor at about 450° F. for several hours to convert substantially all the nickel and molybdenum oxides to the metal sulfides. Analyses of samples of the catalyst showed that it contained at this point about 15 weight percent sulfur. The activity of the freshly prepared catalyst was determined by contacting a light cycle oil boiling between 400° F. and 600° F. and containing 775 p.p.m. nitrogen with the catalyst at 1 LHSV, 645° F., 800 p.s.i.g., and circulating 4000 s.c.f. $H_2$/bbl. The contacted oil contained 0.7 p.p.m. nitrogen after water washing and stripping. The ability to perform this degree of nitrogen removal at the test conditions was defined as 100% activity. The catalyst was then used for the hydrogenation to ammonia of nitrogen compounds contained in a variety of hydrocarbon oils ranging from light naphthas to heavy gas oils, containing from 200 to 4000 p.p.m. nitrogen, at various conditions ranging from 600° F. to 800° F., 800–1100 p.s.i.g. and 0.3 LHSV to 7 LHSV. After a long period of such use, the activity of the catalyst had declined such that at 700° F., 800 p.s.i.g. and 1 LHSV, it would reduce the nitrogen content of the light cycle oil only to 12 p.p.m. nitrogen. To reduce the nitrogen content to 0.7 p.p.m. nitrogen would require the use of a temperature of about 750° F. at the same space velocity and pressure. Thus, the activity of the catalyst had dropped to about 30% of fresh activity (first order reaction kinetics).

Attempts to regenerate samples of the deactivated catalyst of Example 1 by conventional procedures with steam-air mixtures at temperatures above 850° F. were unsuccessful. Better results were obtained when the maximum temperature during regeneration with steam-air was maintained below about 800° F. Even then, rarely was the activity of the catalyst restored to that of the freshly prepared catalyst, and in no case was any activation observed. The following example illustrates the effectiveness of the present invention in increasing the activity of the deactivated catalyst whereby improved results are obtained when the catalyst is subsequently used for the hydrogenative removal of nitrogen compounds from hydrocarbon oil.

*Example II*

A portion of the deactivated catalyst from Example I was placed in a reactor. Dry nitrogen was pumped through the reactor to contact the catalyst at atmospheric pressure while preheating to 530° F. Air was then gradually added to the nitrogen until the oxygen content of the nitrogen-air mixture entering the reactor was 0.6 mol percent. The total gas flow rate was approximately 500 volumes per volume of catalyst per hour. Coke was burned from the catalyst as evidenced by a temperature rise, which was controlled to give a maximum catalyst temperature of 570° F. by adjusting the inlet nitrogen-air temperature and the oxygen content. After the initial burn had subsided, the temperature was increased to give a maximum catalyst temperature of 650° F. while a second burning wave passed through the catalyst in the reactor. The temperature was then gradually increased in increments of 50° F. until a final burn temperature of 800° F. was reached. At this point, the oxygen concentration in the gas mixture entering the reactor was increased to 5 mol percent, but no further burning was observed. The catalyst was then cooled down, and subsequently it was sulfided by passing hydrogen containing 1% dimethyl disulfide through the reactor at about 450° F. The light cycle oil described in Example I was then passed through the reactor contacting the catalyst in admixture with 4000 s.c.f. $H_2$/bbl. at 1 LHSV, 610° F. and 800 p.s.i.g. The contacted oil contained 11 p.p.m. nitrogen after water washing and stripping (as compared to 33 p.p.m. nitrogen with the fresh catalyst at 610° F.). With the activated catalyst the nitrogen content is reduced to below 0.1 p.p.m. at 645° F. and the same pressure and space velocity. The temperature initially required to reduce the nitrogen content of the oil to 0.7 p.p.m. was lowered by about 20° F. Thus, the catalyst after treating as above was about 130% as active as the freshly prepared catalyst used in Example I.

The following example of steam-air regeneration shows the importance of using a dry combustion-supporting gas in accordance with the invention.

*Example III*

A portion of the deactivated catalyst from Example I was regenerated by combustion of coke with a steam-air mixture using a three step procedure wherein the maximum catalyst temperature was 700° F. during a first burn, 800° F. during a second burn, and 900° F. during final contacting with steam-air containing 5% oxygen. After resulfiding, the regenerated catalyst was only 90% as active as the fresh catalyst.

As mentioned, it is preferred to use elevated pressure throughout the process of this invention and to recycle the combustion-supporting gas using the equipment normally employed for recycling hydrogen during the hydrogen treating process. The following example illustrates the use of this invention in the manner preferred for a large scale commercial operation, i.e., at elevated pressure with recycled combustion supporting gas.

*Example IV*

The partially regenerated catalyst of Example III was used for hydrogenative removal of nitrogen compounds from hydrocarbon oils, as in Example I. Oil in admixture with excess hydrogen was preheated in a furnace and then passed continuously through a reactor containing the catalyst as three fixed beds. The reactor effluent was cooled to condense normally liquid hydrocarbons, and water was injected to remove the ammonia formed. Oil and foul water were separated from hydrogen-rich recycle gas in a high pressure separator. The hydrogen-rich gas and added make-up hydrogen were recycled for admixture with incoming feed by means of a recycle gas compressor. Processing was continued until the catalyst was so deactivated by coke deposits that a temperature of over 800° F. was required to reduce the nitrogen content of a 409–832° F. boiling range catalytic cracker heavy heart cut recycle oil from 925 p.p.m. to 2 p.p.m. at 1200 p.s.i.g. and 1.0 LHSV circulating 4000 s.c.f. of hydrogen per barrel of oil. With the fresh catalyst of Example I, this oil was purified to 2 p.p.m. nitrogen at 695° F., 1200 p.s.i.g., 1.0 LHSV and 4000 s.c.f. $H_2$/bbl. Oil feed was then stopped and the system cooled down while hydrogen circulation was continued, to purge the reactor and high pressure separator of oil. The reactor, high pressure separator, and gas recycle system were purged of hydrogen by displacing with nitrogen, and a nitrogen pressure of 600 p.s.i.g. was established in the closed system. Nitrogen was circulated through the reactor and high pressure separator by means of the recycle gas compressor while raising the temperature at the reactor inlet to about 625° F. An aqueous 12% caustic solution was injected into the reactor effluent nitrogen (cooled to about 150° F.), and collected in the high pressure separator. Air was then added to the nitrogen at the reactor inlet to give a nitrogen-air mixture containing 0.5 mol percent oxygen. A burning wave passed through the catalyst at a maximum temperature of about 725° F. The $SO_2$ and $CO_2$ produced were continuously scrubbed out of the gas leaving the reactor by the caustic solution. A relatively fixed level of caustic solution was maintained in the separator by withdrawing spent caustic therefrom and adding fresh caustic to the reactor effluent. No sulfur oxides could be detected in the scrubbed gas. When the burning wave subsided, the temperature of the reactor inlet was increased to about 700° F. whereupon a second burning wave passed through the catalyst at a maximum temperature of about 850° F. When the second burn was complete, the temperature at the reactor inlet was increased to 900° F. and the oxygen content of the nitrogen-air mixture was increased to 4 mol percent for about 4 hours. No burning was noted. The pressure had risen to about 900 p.s.i.g. due to the continued addition of air to the closed system. The system was then purged of oxygen with nitrogen; the caustic solution was dumped; and the nitrogen was displaced with hydrogen. Hydrogen was then circulated at 600 p.s.i.g. and 450° F. while adding isopropylmercaptan to sulfide the catalyst. The catalyst temperature increased to 600° F. during sulfiding. The catalyst was then tested for hydrodenitrification of the heavy heart cut recycle oil as before. It was found that the nitrogen content could be reduced to 1.4 p.p.m. at 695° F. and conditions otherwise the same as previously described. Thus, activity of the regenerated catalyst was about 105% of fresh catalyst activity. Activation was not as great as in Example II because of the slightly higher temperatures used throughout and because the catalyst had been previously regenerated with steam-air.

A series of tests were made, using the coked catalyst of Example I, to determine the effect of such variables as pressure, moisture content, temperature during the initial burn, and temperature during the final burn on the activity of the treated catalyst. It was found that temperatures as high as 750° F. may be permitted during the first burn (maximum catalyst temperature) and that maximum catalyst temperatures as high as 950° F. may be permitted during the final oxidation step, i.e., to ensure that all carbonaceous deposits have been removed. Better results were obtained, however, when lower temperatures were employed in each of these steps. Thus, when the final oxidation was at 950° F., the catalyst was just regenerated to 100% of fresh activity; at 900° F., the treated catalyst had 115% of fresh activity. Similarly, when the maximum temperature during the initial burn was limited to 570° F., the catalyst was significantly more active than when the maximum temperature during the initial burn was 700° F.

The method has been successfully used at atmospheric pressure, 600 p.s.i.g., 1000 p.s.i.g., and 1200 p.s.i.g. There appears to be no upper limit on the pressure which may be employed. Preferably, the pressure used is substantially that used during the hydrocarbon treating, to take the full advantage of the equipment capabilities.

Moisture content of the nitrogen-air mixture was varied from essentially bone dry (once-through flow of laboratory nitrogen with predried air) to 14 mol percent $H_2O$. Best results were obtained when the combustion-supporting gas was bone dry. Nevertheless, when the water vapor partial pressure in the gas was 3.7 p.s.i.a., at a total pressure of 600 p.s.i.g., the treated catalyst had a higher activity than when the gas contained water vapor at a partial pressure of only 1 p.s.i.a., at a total pressure of about 2.5 p.s.i.g. It will be noted that at the elevated pressure, the concentration of water vapor was only about 0.6 mol percent, but at the lower pressure the water vapor concentration was about 6 mol percent.

Oxygen concentration in the combustion-supporting gas supplied to the reactor during the initial burning step was varied from 0.1 volume percent to 1 volume percent. The oxygen concentration is primarily controlled to limit the temperature rise accompanying combustion of the coke and oxidation of the metal sulfides to less than 200° F. However, better results were noted when lower oxygen concentrations were used, at any given catalyst temperature. It will be noted that with a low inlet oxygen concentration, the water vapor concentration resulting from coke combustion from the first catalyst contacted is correspondingly limited to a low concentration in the gas contacting catalyst further downstream.

During the final oxidation, oxygen concentrations of 6% or higher may be permitted. Preferably, the oxygen content is at least 1%. In some cases, straight air may be used. The principal consideration here is that too high an oxygen concentration cannot be permitted until it is assured that all combustible materials and water-generating hydrogen have been removed.

When sulfur oxides are not removed from the system, the regenerated catalyst contains a large percentage of residual sulfur as inactive sulfates. The sulfates are leachable by water, and the leached material contains nickel and molybdenum as well as aluminum. By removing sulfur oxides in accordance with the invention, sulfate formation is kept at a low level.

The present invention applies especially to the hydrodenitrification process, i.e., where the removal of nitrogen compounds from hydrocarbon oils is the primary process objective. On the other hand, the high metal content, sulfided, nickel-molybednum-alumina catalysts are useful in other hydrogen treating processes, such as decolorization, where nitrogen removal is an incidental, though essential, adjunct. Thus, it is found that the degree of color improvement of an oil during hydrogen treating closely parallels the degree of nitrogen removal. Other examples are increasing the viscosity index of lubricating oils or hydrocracking heavy oils, where conditions leading to nearly complete nitrogen removal are used. If the process could as effectively be controlled by reference to the nitrogen content of the product as by reference to any other variable, the present invention applies even though nitrogen content may not be the control variable actually selected for measurement.

It should also be noted that although the present invention may be viewed as a procedure for activating the high metal content, sulfided, nickel-molybdenum-alumina catalysts, it is applied only to coked catalysts. When a freshly prepared sulfided catalyst was carried through the procedure of contacting with a dry nitrogen-air mixture free of $SO_2$ at a catalyst temperature controlled between 550° F. and 650° F. to oxidize the nickel and molybdenum sulfides to nickel and molybdenum oxides, then contacting with the dry nitrogen-air mixture at a catalyst temperature controlled between 700° F. and 850° F., then contacting with the dry nitrogen-air mixture at 900° F., and subsequently resulfiding, the activity of the catalyst was not changed. Hence, previous coking of the catalyst is an essential step in the method of the invention. Several theories may be propounded to explain this observed fact. It may be that the exposure of the catalyst for a long time to the temperature and pressure conditions of the hydrodenitrification process alter the catalyst structure in a manner which leads to improved activity when the catalyst is subsequently contacted with the dry combustion supporting gas at the conditions disclosed herein, whereas the structure is converted to a less active form when conventional regeneration methods are used. It may also be that the mere presence of coke in the catalyst pores leads to an expansion of the pores when the method of the invention is applied, whereas sintering occurs when conventional regeneration methods are used. The pore volume of the activated catalysts is usually greater than that of the fresh catalyst.

It should be emphasized, however, that the invention is not limited to the activation only of coked freshly prepared catalysts. As already mentioned, the method may also be used to regenerate the activated catalyst after it has been coked. Also, a fresh catalyst which was used until coked, then regenerated (partially) with steam-air, and again used until coked, was activated by means of the invention to slightly better than fresh activity. Repeated steam-air regenerations will, however, permanently deactivate the catalyst. The method of this invention can be used at least three times as a regeneration procedure before any permanent deactivation sets in.

I claim:

1. The method of regenerating a high metal content, sulfided, nickel-molybdenum-alumina catalyst containing at least 10 weight percent sulfur combined with the nickel and molybdenum, which catalyst has been deactivated by the deposition of combustible carbonaceous material thereon during use for hydrodenitrification of hydrocarbon oils by passing hydrocarbon oil and hydrogen at elevated temperature of 600–800° F. and a pressure above 500 p.s.i.g. through a reactor containing said catalyst as at least one fixed bed of catalyst particles, cooling the reactor effluent, separating hydrogen-rich gas from liquid hydrocarbons in a high pressure separator, and recycling said hydrogen-rich gas through a gas recycle system to the reactor inlet; which method comprises: purging the reactor, high pressure separator, and gas recycle system of hydrocarbon oil and hydrogen and introducing nitrogen therein to establish a nitrogen pressure of at least 500 p.s.i..g, burning said carbonaceous material and oxidizing nickel and molybdenum sulfides by circulating said nitrogen through the reactor, high pressure separator, and gas recycle system at a pressure of at least 500 p.s.i.g. while removing $SO_2$ from and adding air to the circulating nitrogen to provide at the reactor inlet a nitrogen-air mixture containing 0.1–2 mol percent oxygen and free of sulfur oxides, controlling the oxygen concentration and temperature of the nitrogen-air mixture at the reactor inlet to control the maximum catalyst temperature (a) between 500° F. and 750° F. until an initial burning wave has passed through the catalyst beds and (b) at least 50° F. higher but between 650° F. and 850° F. while a second burning wave passes through the catalyst beds, thereafter increasing the oxygen concentration and temperature of the nitrogen-air mixture at the reactor inlet to control the maximum catalyst temperature at least 50° F. higher but between 800° F. and 900° F., and subsequently resulfiding the catalyst.

2. The method of claim 1 wherein the pressure is at least 1000 p.s.i.g. throughout said regeneration.

3. The method of claim 1 wherein said catalyst comprises 4–10 weight percent nickel and 15.5–30 weight percent molybdenum, expressed as the metals.

4. The method of claim 1 wherein $SO_2$ is removed from the circulating nitrogen by contacting with an aqueous caustic solution in the high pressure separator.

5. A process for activating a high metal content nickel sulfide-molybdenum sulfide-alumina catalyst containing at least 10 weight percent sulfur combined with the nickel and molybdenum, which catalyst has been deactivated by the deposition thereon of combustible carbonaceous material during use for hydrogen treating hydrocarbon oils at elevated temperature of 600–800° F. and pressure of 500–5000 p.s.i.g., which process comprises burning a major portion of the carbonaceous material from the catalyst and oxidizing a major portion of the nickel and molybdenum sulfides to nickel and molybdenum oxides by circulating dry inert gas through a reactor containing said catalyst, removing $SO_2$ from the gas leaving said reactor and then adding air to the gas to provide a dry combustion supporting gas free of sulfur oxides having a controlled low oxygen content and a controlled low temperature entering said reactor such that the temperature rise accompanying combustion is less than 200° F. and results in the maximum catalyst temperature being controlled between 500° F. and 750° F. at least during an initial burn until combustion substantially ceases, and subsequently resulfiding the catalyst.

6. The process of claim 5 wherein the pressure of circulating gas is maintained above 500 p.s.i.g. during the burning period.

7. The process of claim 6 wherein the oxygen content of said dry combustion supporting gas entering said reactor is from 0.1 volume percent to 1 volume percent.

8. The process of claim 5 wherein, after said burning at between 500° F. and 750° F. prior to resulfiding, additional carbonaceous material is burned from the catalyst at a maximum catalyst temperature which is at least 50° F. higher but controlled below 850° F. until burning substantially ceases, by circulating dry inert gas, removing $SO_2$, and adding air in the manner prescribed in claim 5.

9. The process of claim 8 wherein said dry combustion supporting gas has a controlled, low oxygen content between 0.1 and 2 mol percent.

10. The process of claim 8 wherein following said burning at a maximum catalyst temperature controlled below 850° F., prior to resulfiding, dry combustion supporting gas containing at least one volume percent oxygen is circulated through the reactor at a maximum catalyst temperature at least 50° F. higher but controlled below 950° F.

References Cited in the file of this patent

UNITED STATES PATENTS

| | | |
|---|---|---|
| 2,370,707 | Archibald | Mar. 6, 1945 |
| 2,386,050 | Holder | Oct. 2, 1945 |
| 2,602,773 | McKinley et al. | July 8, 1952 |
| 2,813,835 | Nozaki | Nov. 19, 1957 |
| 2,894,903 | McGrath et al. | July 14, 1959 |
| 2,963,425 | Hansen | Dec. 6, 1960 |
| 2,985,584 | Rato et al. | May 23, 1961 |
| 3,094,480 | Richardson | June 18, 1963 |
| 3,114,701 | Jacobson et al. | Dec. 17, 1963 |

UNITED STATES PATENT OFFICE
CERTIFICATE OF CORRECTION

Patent No. 3,172,864                          March 9, 1965

Jack W. Unverferth

It is hereby certified that error appears in the above numbered patent requiring correction and that the said Letters Patent should read as corrected below.

Column 2, line 41, for "stream-air" read -- steam-air --; column 3, line 28, for "500-700° F." read -- 500-750° F. --; line 29, for "500-650° F." read -- 550-650° F. --.

Signed and sealed this 27th day of July 1965.

(SEAL)
Attest:

ERNEST W. SWIDER                                EDWARD J. BRENNER
Attesting Officer                                     Commissioner of Patents